A. F. GILLET.
WINDSHIELD WIPER.
APPLICATION FILED DEC. 6, 1920.

1,371,363.

Patented Mar. 15, 1921.
2 SHEETS—SHEET 1.

Inventor
A. F. Gillet.
By Arthur H. Sturges.
Attorney

A. F. GILLET.
WINDSHIELD WIPER.
APPLICATION FILED DEC. 6, 1920.
1,371,363.
Patented Mar. 15, 1921.
2 SHEETS—SHEET 2.
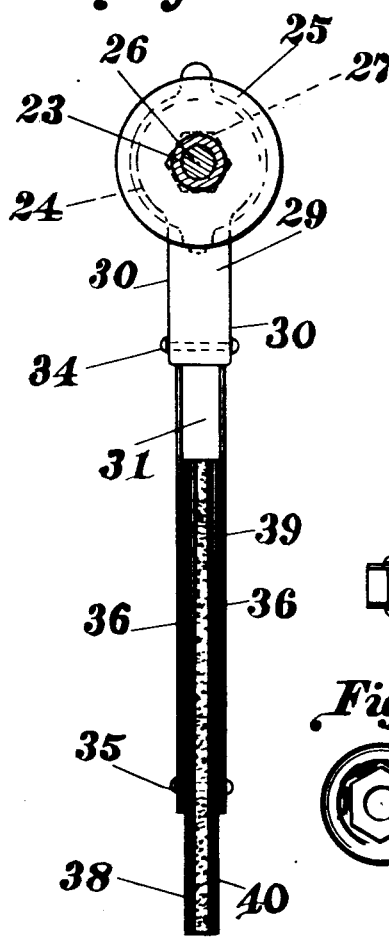
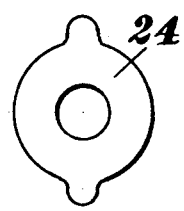
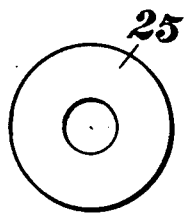
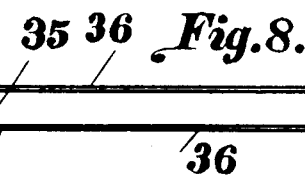
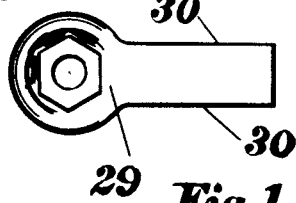
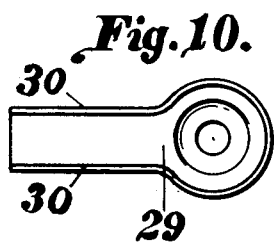
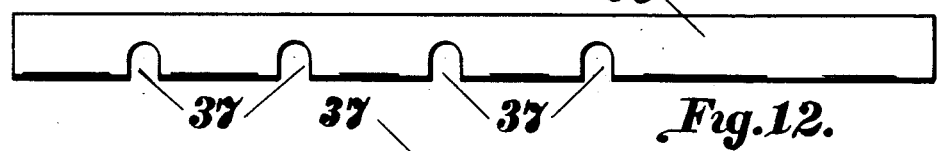
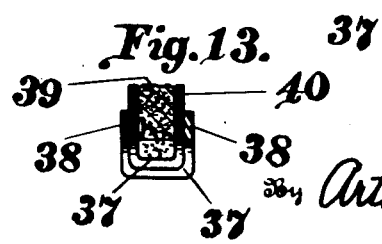
Inventor
A. F. Gillet,
By Arthur H. Sturges.
Attorney

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA.

WINDSHIELD-WIPER.

1,371,363.  Specification of Letters Patent.  Patented Mar. 15, 1921.

Application filed December 6, 1920. Serial No. 428,513.

*To all whom it may concern:*

Be it known that I, ALEXIS F. GILLET, a citizen of the United States, residing at Omaha, in the county of Douglas and State of Nebraska, have invented certain new and useful Improvements in Windshield-Wipers, of which the following is a specification.

The present invention relates to windshield wipers for cleaning windshields of rain, snow, moisture accumulations and the like.

An object of the invention is to provide a wiper which may be easily and quickly applied to the windshields of motor vehicles of the closed type, such as sedans, coupés and the like.

Another object of the invention is to provide a wiper which is adjustable so that the surface area to be cleaned may be varied according to conditions met with, not only in the construction of cars of different types, but also in conditions of use by the operator to effect the desired clear vision at the desired height and extent through the windshield.

Another object of the invention is to provide an improved type of wiper of novel construction for effecting the cleansing and wiping action when the device is operated.

The invention has for a still further object a provision of a windshield wiper which will provide the required pressure of the wipers on the glass or pane of the windshield to remove the various accumulations which interfere with clear vision through the windshield; which provides an easy means for manual operation; and which provides a cleaner capable of operation from either side of the pane of glass.

A further object of the invention is to provide a cleaner composed of relatively few parts which may be economically pressed or formed from sheet metal; which is constructed to provide the desired pressure by use of relatively light springs; and to provide a wiper which, when not in use, will not be in the way and will not impair vision through the glass.

With the foregoing and other objects in view, the invention will be more fully described hereinafter, and will be more particularly pointed out in the claim appended hereto.

In the drawings, wherein like symbols refer to like or corresponding parts throughout the several views,—

Fig. 3 is a longitudinal section taken through the windshield wiper substantially on the line 3—3 of Fig. 1;

Fig. 4 is a plan view of a binding washer or nut for securing the wiper to the pane of glass;

Fig. 5 is a plan view of a packing washer adapted for interposition between the binding washer and the pane of glass;

Fig. 6 is a side elevation of the shaft of the wiper;

Fig. 7 is a side elevation of a bushing used for engagement through a hole bored in the pane of glass;

Fig. 8 is an inner side view of one of the wiper arms;

Fig. 9 is an inner side view of one of the arm-supporting brackets used for connecting an arm to the shaft;

Fig. 10 is an outer side view of the same;

Fig. 11 is an enlarged side elevation of one of the wiper frames;

Fig. 12 is an inner edge view of the same; and

Fig. 13 is a fragmentary cross sectional view through one of the wipers taken substantially on the line 13—13 of Fig. 1.

Figure 1:
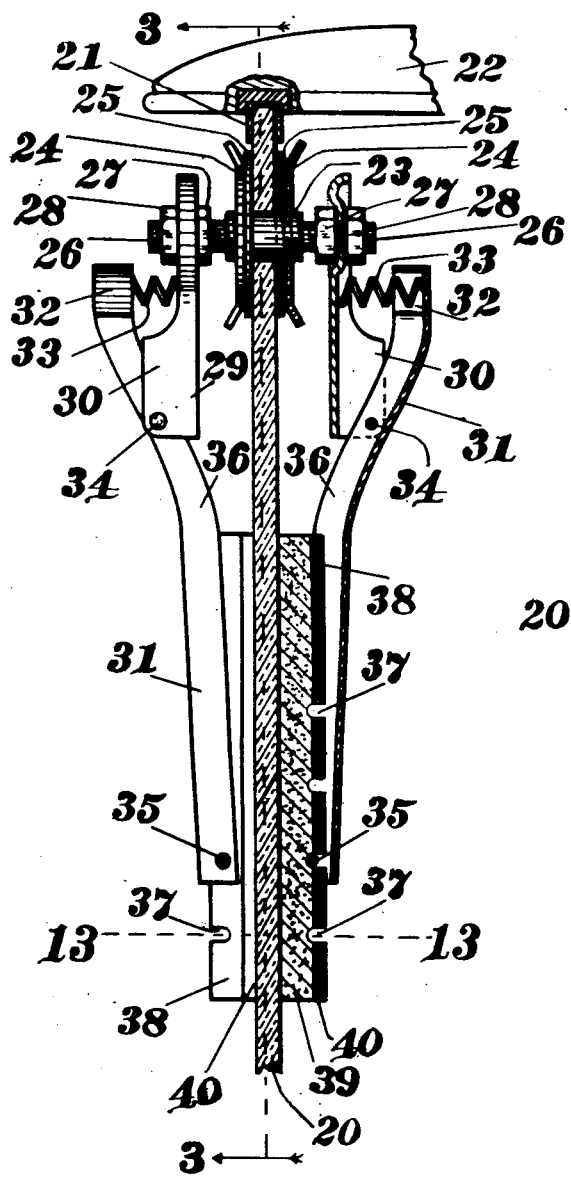
Figure 1 is a transverse section through a portion of a windshield installed on a car of the closed type and showing a windshield wiper constructed according to the present invention applied thereto, one-half of the wiper being shown in section.

Referring to the drawings, 20 designates the pane of glass of the windshield which is mounted in a suitable frame 21 seated at its upper end in the vehicle top 22, the construction in the present instance being somewhat conventional of automobiles of the closed type.

Figure 2:
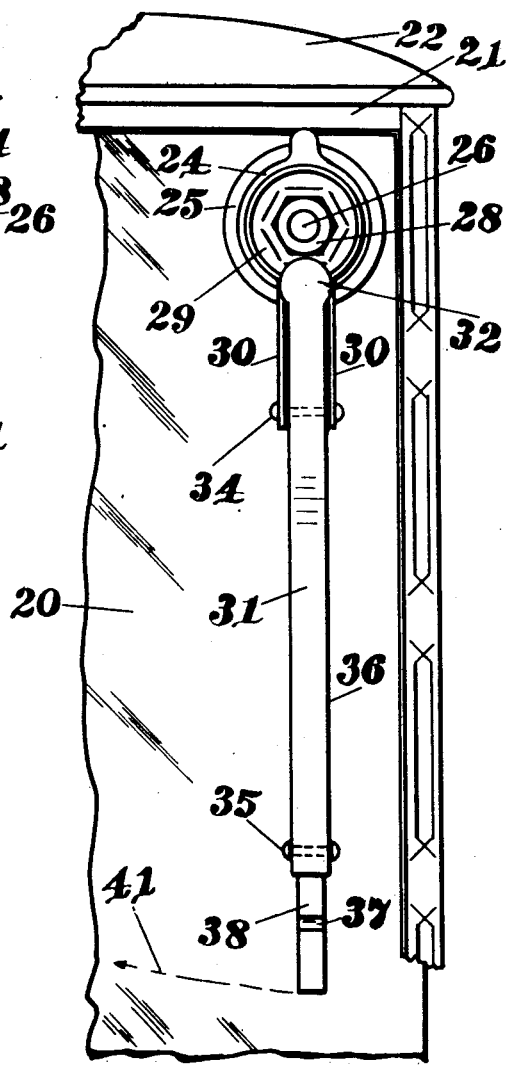
Fig. 2 is a fragmentary front elevation of the same.

The pane of glass 20 is bored to the desired size at the upper left-hand corner, or at the corner adjacent the driver or operator of the vehicle, such as shown in Fig. 2 for automobiles of the left-hand drive type. In the opening through the pane of glass 20 is placed a bushing 23 which is adapted to fit snugly through the opening and which is threaded exteriorly on opposite ends to receive binding washers or nuts 24 adapted to be turned up on the opposite ends of the bushing for binding the same in the pane of glass.

Packing washers 25 of rubber or other suitable compressible material are interposed between the binding washers or nuts 24 and the pane of glass to protect the latter and to insure the rigid mounting of the bushing 23 in the windshield. A shaft 26 is inserted through the bushing 23 and is adapted to freely turn therein.

The shaft 26 is threaded on opposite ends to receive pairs of clamping nuts 27 and 28 adapted to bind therebetween brackets 29, one on each end of the shaft 26. The nuts 27 and 28 are threaded on the shaft 26 and are adapted, the nuts of each pair, to bind against opposite sides of the brackets 29 and thus rigidly secure the brackets upon the shaft to turn therewith.

Each bracket 29 is preferably formed from pressed sheet metal and is of channel cross section with enlarged flanges 30 at one end and with an inwardly pressed and countersunk portion at its other end, the inwardly pressed portion conforming in marginal configuration to that of the adjacent inner nut 27 for receiving the nut therein and for holding a nut from turning relatively to the bracket 29.

The outer nut 28 of each pair is adapted to be turned against the outer side of the bracket 29 and may engage directly thereagainst as shown in Fig. 1, or may be provided with any conventional form of locking means for maintaining the nut 28 rigidly against the bracket 29. The brackets 29 are thus locked upon the shaft 26.

Between each pair of outwardly extending flanges 30 of the brackets 29 is pivoted a wiper arm 31. This wiper arm 31 is of channel cross section of pressed steel or the like and formed at its upper end with a cup or spring seat 32, the arm 31 being adapted to be mounted between the flanges 30 with the concavity facing the pane of glass 20. A spring 33 is interposed between the upper end of each arm 31 and its adjacent bracket 29 with the outer end of each spring seated in the adjacent cup 32 and the inner ends of the springs bearing against the outer sides of the brackets 29 between the flanges thereof.

The arms 31 are curved outwardly away from the pane of glass 20 at their upper ends, are secured between the flanges 30 by rivets 34 or the like, and extend upwardly beyond the rivets in spaced relation to the outer sides of the brackets 29. The lower or free ends of the arms 31 are thus normally urged inward toward the pane of glass 20 by the spring 33.

The arms 31 carry, in their free ends, transverse pins 35 which are secured at opposite ends in the lateral flanges 36 of the arms 31 and the pins 35 are adapted to selectively engage in a series of notches or recesses 37 formed transversely in the outer edges of wipers which are adapted to be interposed between the free ends of the arms 31 and the pane of glass 20.

The wipers may be of desired construction, but preferably are each of the construction shown in the accompanying drawings and wherein each wiper has a channeled frame 38 of suitable length which, at its closed edge, is provided with the transverse notches 37 and which is adapted to resiliently grasp the opposite sides of a strip of felt 39 or other suitable material used for wiping the windshield.

As shown in Fig. 13, the strip of felt 39 is preferably inclosed in a sheet of rubber 40 which is overturned about the inner edge of the felt strip 39 and has its end portions interposed between the felt strip 39 and the side flanges of the wiper frame 38.

In assembling the windshield wiper of this invention, one bracket 29 with its frame 31 may be first fixed upon one end of the shaft 26. The pane of glass 20 is bored at the desired point preferably near the top and near one corner of the windshield. The arrangement of this opening or bore in the glass is such that when the wiper is swung upwardly, it will clear an area of the pane 20 which is defined at its upper portion in a substantially horizontal line as this is the ideal form of cleared surface of the glass for uninterrupted vision through the windshield.

The bushing 23 is now inserted through the opening in the glass, the packing washers 25 pressed from the opposite ends of the bushing 23 and the binding nuts 24 then turn up against the opposite sides of the bushing to correctly position it. The free end of the shaft 26 is now inserted through one end of the bushing 23.

The inner nut 27 is then threaded on the shaft, the bracket 29 placed over the shaft against the nut 27 in interlocking engagement with the nut 27. The outer nut 28 is now turned up against the bracket 29 to bind it against the nut 27 and jam the two nuts upon the shaft 26 to lock the bracket 29 from turning thereon.

The wipers 38 may now be positioned between the free ends of the arms 31. To place a wiper in position, the free end of the arm 31 is drawn out and the wiper 38 inserted beneath the arm between the flanges 36 thereof to the desired position when the arm 31 is freed for movement against the wiper and the cross-bar or rivet 35 in the free end of the arm 31 engages in the adjacent notch 37 but maintaining the wiper from longitudinal displacement from the arm.

The flanges 36 hold the wiper from lateral displacement from the arm 31.

In operation it is only necessary to grasp the adjacent arm 31 and swing it in the desired direction, such as shown by the arrow 41 in Fig. 2 to raise the arms 31 and move the wipers 38 therewith for clearing the desired section of the windshield.

It is preferable to space the inner nuts 27 from the ends of the bushing 23 so that the springs 33 may equalize their pressure upon the arms 31 and thus bind the wipers 38 with equal force against the opposite sides of the pane of glass 20.

The wipers may be quickly adjusted upon the arms 31 so as to clear the desired section of the windshield and adapt the device for use of drivers who sit high or low behind the steering wheel of the vehicle.

I do not wish to be restricted to the size, form, and proportions of the various parts, and obviously changes could be made in the construction herein described without departing from the spirit of the invention, it being only necessary that such changes fall within the scope of the appended claim.

What is claimed is:—

In a windshield wiper, the combination of a rotatable support, inwardly urged arms carried upon opposite ends of the support, a transverse pin carried in the free end of each arm, and a wiper for each arm, each wiper having a series of notches in its outer edge adapted to selectively receive the pin of the adjacent arm therein whereby said arm is adapted to yieldingly interlock in the adjusted position with the wiper and maintain the same against the side of the windshield.

In testimony whereof I have affixed my signature in presence of two witnesses.

ALEXIS F. GILLET.

Witnesses:
ARTHUR H. STURGES,
HIRAM A. STURGES.